Figure 1:
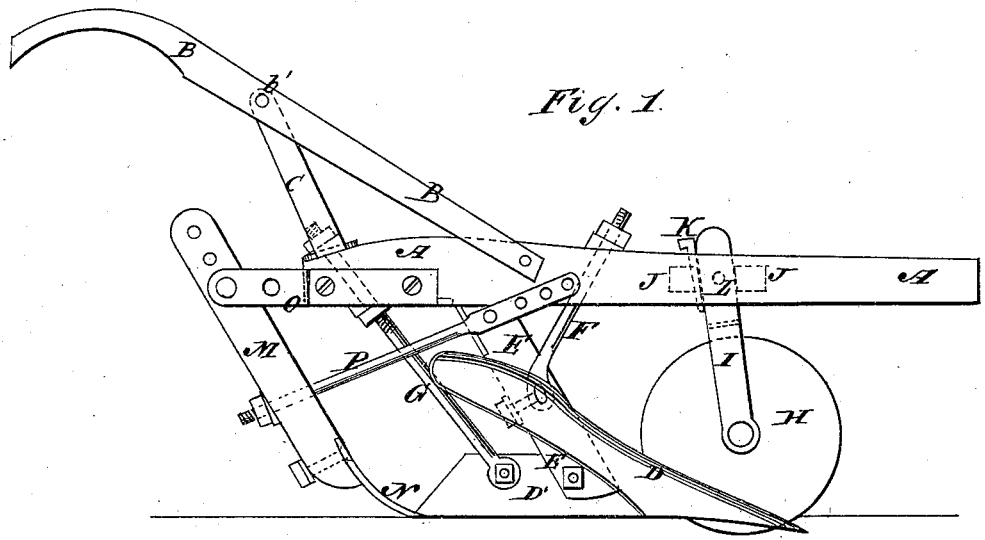
Figure 2:
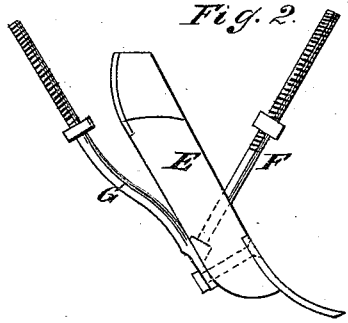
Figure 3:
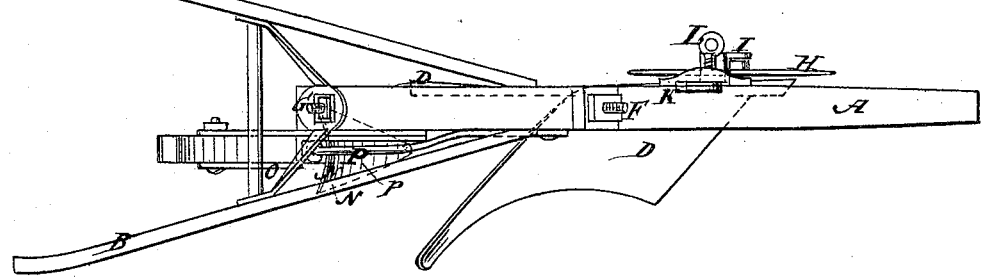

R. A. BROWN.
Plows.

No. 145,088.                           Patented Dec. 2, 1873.

Witnesses.                              Inventor.

UNITED STATES PATENT OFFICE

RICHARD A. BROWN, OF OAKLAND, MISSISSIPPI.

IMPROVEMENT IN PLOWS.

Specification forming part of Letters Patent No. 145,088, dated December 2, 1873; application filed July 26, 1873.

*To all whom it may concern:*

Be it known that I, RICHARD A. BROWN, of Oakland, in the county of Yalabusha and State of Mississippi, have invented a new and useful Improvement in Plows, of which the following is a specification:

My invention is an improvement in plows of the class in which the angle of the share or shovel standard is adjustable with relation to the beam. The improvement relates to the arrangement of combined adjusting and brace rods with the plow proper and its standard, as hereinafter described.

The drawing represents a side elevation of a plow, showing my invention.

The handles B are connected together by the round $b'$, and to the beam A by a brace, C, in the ordinary manner. A plow, D, having a rear land-side extension, $D'$, is secured to the foot of the standard E, and the latter is connected with the beam by tenon and mortise, (the former having a rounded shoulder,) so that it may be adjusted in a vertical plane at a greater or less pitch or angle to the beam. A forward-inclined brace-rod, F, is connected with the standard, and passes through the beam. A similar rod, G, having nearly the same inclination as the standard E, is pivoted to the land-side extension $D'$, and passes through the rear end of the beam. The upper ends of these rods E and F are screw-threaded, and nuts are applied thereto, as shown, so that by adjusting them the lower end of the standard E, and with it the plow D, can be moved forward or back to vary the pitch of the latter, and thereby govern the depth to which it will enter the soil. The thread on the rod G extends below the beam A, and a nut is arranged thereat, to enable the rod to sustain the upward and backward pressure which necessarily results when the plow is performing its function. By this arrangement of parts the pitch of the plow is readily varied; and it is so braced by the rod G that only an ordinary screw-bolt is requisite to secure it to the standard, and the latter does not require to be specially strong or of peculiar form.

The implement is designed for use mainly as a furrowing and barring-off plow. To throw fresh earth around the roots or stems of the plants from which the "old" earth has been wholly or partially removed by the share D, I provide the shovel N, whose standard M is pivoted to a rearward extension, O, of the beam A, and braced by rod P, that extends forward and is secured to the beam.

Both standard and rod have a number of holes formed in their upper ends, to adapt them to be adjusted to vary the pitch of the shovel N, and the depth to which it shall run, correspondent to the adjustment of the plow D. A revolving circular colter or cutter, H, is mounted in standard I, which is adjusted vertically in keeper J by wedge K and clamp-screw L.

What I claim is—

The combined brace and adjusting-rods F and G and their screw-nuts, in combination with the plow D and pivoted standard E, the rod G being pivoted to the rear extension of the land-side $D'$, and all arranged with relation to the beam A, as shown and described, for the purpose specified.

RICHARD ALEXANDER BROWN.

Witnesses:
R. M. BLACKBURN,
J. G. ALLEN.